July 1, 1958 D. M. STOUGH 2,841,162
APPARATUS FOR COMPUTING OUTPUT PRESSURES BASED
ON ONE OR MORE INPUT PRESSURES
Filed Dec. 8, 1955 5 Sheets-Sheet 3

INVENTOR.
DONALD M. STOUGH
BY
Zugelter & Zugelter
Attys.

United States Patent Office 2,841,162
Patented July 1, 1958

2,841,162

APPARATUS FOR COMPUTING OUTPUT PRESSURES BASED ON ONE OR MORE INPUT PRESSURES

Donald M. Stough, Penn Township, Allegheny County, Pa., assignor to Hagan Chemicals & Controls, Inc., a corporation of Pennsylvania Application December 8, 1955, Serial No. 551,795

7 Claims. (Cl. 137—85)

This invention relates to ratio computers that are responsive to one or more input conditions and produce outputs that may be linearly proportional to the ratio of one of said input conditions to the other, or proportional to an exponential function of an input, or to the product of several inputs, or to the difference between two inputs.

An object of this invention is to provide a device having several input condition responsive devices, means actuated by the joint action of the input responsive devices for producing an output and means responsive to the output for so modifying the output producing means that the output is always proportional to the ratio of one input condition to the other.

Another object of the invention is to provide a pressure ratio computer or device as set forth in the preceding object having a pair of variable pressure input responsive devices, one of the pair receiving a variable pressure $P_1$ and the other a variable pressure $P_2$, means actuated in response to the joint effect of said pressures $P_1$ and $P_2$ for establishing a variable pressure $P_3$, means responsive to the variable pressure $P_3$ for establishing an output pressure $P_4$, and means responsive to the output pressure $P_4$ for so modifying the pressure $P_3$ that the pressure $P_4$ is linearly proportional to the ratio of pressure $P_2$ to pressure $P_1$.

Another object of the invention is to provide a system in which the output pressure may be caused to vary as the square of the input pressure.

A further object of the invention is to provide a system in which the output pressure may be caused to vary as the square root of an input pressure.

A still further object of the invention is to provide a system in which the output pressure may be caused to vary as the product of several input pressures.

A further object is to provide a system that will provide an output Q that is proportional to inputs $$\frac{P_2-P_1}{P_1} \text{ or to } \frac{P_2}{P_1}-1$$

And a still further object of the invention is to provide a system whereby the ratio of the intake pressure to the output pressure of a compressor may be controlled within limits which will prevent surging of the compressor, the system being responsive to the intake and output pressures of the compressor in terms of absolute pressure.

The foregoing and other objects of the invention will be apparent to those of ordinary skill in the art to which the invention pertains from the following description and the accompanying drawings.

In the drawings.

where $P_2$ and $P_1$ are the input pressures; and

Figure 1:
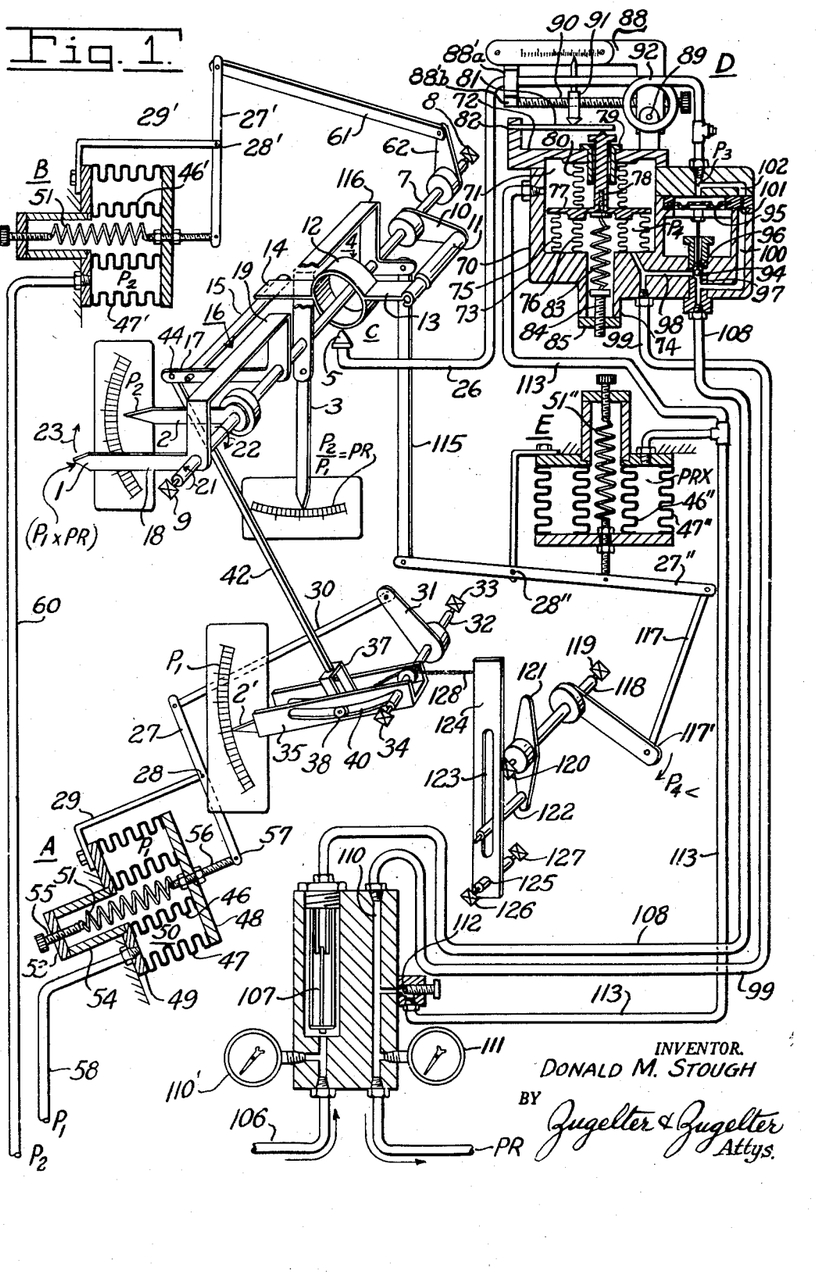
Figure 1 is a more or less schematic view of a system arranged and constructed in accordance with an embodiment of the invention in which an output is generated that is proportional to the ratio of several input pressures.
Figure 2:
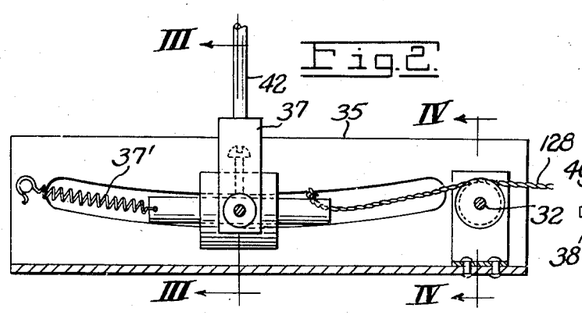
Fig. 2 is a view in longitudinal section of a compensating mechanism embodied in the apparatus of Fig. 1.
Figure 3:
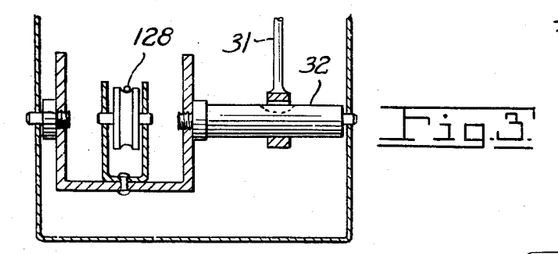
Figs. 3 and 4 are views in section taken on lines III—III and IV—IV, respectively, of Fig. 2.
Figure 4:
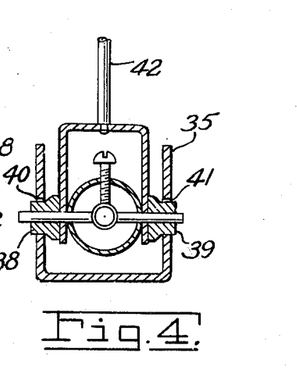

The apparatus of Fig. 1 is arranged to receive several input pressures, for example, pressures $P_1$ and $P_2$ and develop a resultant output pressure PR that is proportional to the ratio of $P_2$ to $P_1$. In other words, the apparatus continuously computes the ratio of $P_2$ to $P_1$ in terms of an output pressure PR.

In that apparatus there are indicator arms 1, and 2 which take the same position relative to the scales thereof, a pointer 2' that is positioned by the pressure input $P_1$ and a pointer 3. Pointer 1 indicates the product of the reading of pointer 2' and pointer 3.

The position of pointer 2 indicates the magnitude of pressure $P_2$ and pointer 3 indicates the ratio of $P_2$ to $P_1$. Pointer 2' indicates the magnitude of pressure $P_1$.

The apparatus of Fig. 1 comprises pressure input devices A and B that respond to the pressure inputs $P_1$ and $P_2$, respectively, means C for establishing a variable pressure $P_3$, a device D that responds to the variable pressure of means C and develops an output pressure PR, and a device E that responds to the output PR and modifies the variable pressure developed by means C.

Means C as illustrated comprises a baffle 4 and a nozzle 5 through which air discharges at a rate that is determined by the space between the baffle 4 and the tip of the nozzle. The baffle 4 is actuated jointly through a system of linkages and levers, to be described infra, by the devices A, B and E and the nozzle 5 is operated by the device D. The resultant produced by the coaction of the above mentioned devices, and means C, is a pressure PR which is proportional to the ratio of $P_2$ to $P_1$.

The linkage and lever system by which the baffle 4 is actuated with reference to the tip of nozzle 5 comprises a shaft 7 mounted in bearings 8 and 9 and having a crank arm 10 fixed to the shaft. The crank arm 10 is provided with a laterally projecting support pin 11 on the end of which the baffle 4 is pivotally supported. The baffle 4 as shown comprises a ring portion 12 having an arm 13 that is connected to the pin 11 as shown, and an oppositely extending arm 14. Arm 14 is supported on a pin 15, one end of which is secured to a yoke 16.

The yoke 16 as shown comprises two L-shaped lever arms 17 and 18, the shorter legs of which are connected by a bridge 19. The members 17 and 18 are freely rotatable on the shaft 7. The long leg of the L-shaped member 18, as shown, forms the pointer 1 for indicating the product of $(P_1 \times PR)$.

If the rotation of shaft 7 is in the direction of arrow 21, crank arm 10 lifts the baffle portion 12 away from the tip of nozzle 5 because at that time the arm 14 of the baffle rests on the pin 15. When rotation of shaft 7 is in the direction of arrow 22 the baffle portion 12 is moved towards the tip of nozzle 5.

If the L-shaped arms 17 and 18 move in the direction of arrow 23, shaft 7 remaining stationary, the baffle pivots about its connection to pin 11 and moves away from the tip of nozzle 5, and if the arms move in the opposite direction, the baffle moves towards the tip.

The nozzle 5 is connected to a pipe 26 carried by device D which supplies air pressure to the nozzle 5. Thus as the clearance between the baffle and the tip of nozzle 5 changes, the pressure in pipe 26 changes also.

Device A is connected to the lever arm 17 by a lever 27 that is pivotally supported at 28 on a bracket 29 carried by a device A, a link 30, a crank arm 31 which is secured to a shaft 32 mounted in bearings 33 and 34, a compensating frame 35 that is secured to the shaft 32, a yoke 37 having rollers 38 and 39 that operate in curved slots 40 and 41, respectively, in frame 35 and a link 42 that connects the yoke 37 to the arm 17. The arm 17 is pivotally connected to link 42 by a pin 44. The yoke 37 is connected to a spring 37' that urges it towards the free end of frame 35.

Device A comprises a pair of concentric bellows 46 and 47, the ends of which are welded or otherwise secured to plates 48 and 49 so as to form a pressure-tight chamber 50 between the two bellows. The device A also includes a spring 51, one end of which is secured to the member 48 and the other to the end 53 of a cylinder 54 by means of screw 55. The member 48 is connected to lever 27 by a screw-threaded member 56, the inner end of which is attached to the spring 51, and the outer end to the lever by a pivot pin 57.

The pressure $P_1$ is supplied to the chamber 50 by a pipe 58. As the pressure in the chamber 50 increases, lever 27 rotates counterclockwise about the pin 28 and as the pressure decreases, the lever 27 rotates clockwise about the pin 28. When the lever 27 turns counterclockwise in response to increasing pressures $P_1$, the crank arm 31 turns counterclockwise whereby the compensating frame 35 turns counterclockwise about the shaft 32. Such turning of the crank arm 31 and frame 35 results in a downward pull on the link 42 whereby the extension 14 of the baffle is moved downwardly to decrease the clearance between the baffle portion 12 and the tip of the nozzle pipe 5 thereby increasing the pressure in nozzle pipe 26. The position to which the yoke 16 is moved indicates by the position of pointer 1 the instantaneous value of the product of $P_1 \times PR$. At equilibrium the lever 17 will have been rotated to a position where pointer 1 lines up with pointer 2. From this the equations for the unit are derived. Due to the control action of unit D the pointer 1 assumes the same scale position as pointer 2. Pointer 2 indicates pressure $P_2$. Since the pointer 1 value equals the pointer 2 value and pointer 2 value equals the product of the pointer 2' and pointer 3 values, it follows that $$P_2 = P_1 \times PR \text{ or } PR = P_2/P_1$$

Device B is similar to device A; therefore similar and corresponding parts will be designated by the same reference characters with primes affixed. Device B receives the pressure $P_2$ through a pipe 60. As the pressure $P_2$ increases, the lever 27' rotates counterclockwise about its pivot 28'. The rotation of the lever 27' is imparted to the shaft 7 by a link 61 connecting lever 27' to a crank arm 62 which is fast on the shaft 7. The counterclockwise rotation of lever 27' results in counterclockwise rotation of shaft 7 whereby the baffle portion 12 is moved away from the tip of nozzle 5, causing a reduction in pressure in the nozzle pipe 26. If the pressure $P_2$ decreases, the rotation of shaft 7 is clockwise whereupon the baffle portion 12 is moved closer to the tip of nozzle 5, causing the pressure in the nozzle pipe 26 to increase.

The pointer 2 is fast on shaft 7; therefore rotation of shaft 7 which is produced by the device B results in the pointer 2 being positioned along its scale to indicate the instantaneous value of pressure $P_2$.

Device D comprises a housing 70 having a chamber 71 therein. One end of the chamber is closed by a head 72 and the opposite end is closed by a head 73 having a cylindrical extension 74. Within the chamber 71 are concentric bellows 75 and 76. The lower ends of bellows 75 and 76 are secured as by brazing or other suitable means to the head 73 and the upper ends thereof are secured by brazing or other suitable means to a plate 77. Plate 77 has at its center an upwardly extending rod 78 that passes through a bushing 79. The space around the rod 78 and the bushing 79 is sealed from the chamber 71 by means of a bellows 80, the lower end of which is brazed or otherwise secured to the plate 77, the upper end being brazed or otherwise secured to the head 72. The upper end of the rod 78 has a knife edge that engages the underside of a cantilever spring 81, the fixed end 82 of which is carried by the head 72.

The plate 77 is connected by a spring 83 to a screw 84 that is screw-threaded into a nut 85 bearing on the lower end of the cylindrical extension 74 so that the tension in the spring 83 and therefore the loading on the bellows 75 and 76 may be adjusted.

The space between the bellows 75 and 76 receives the output pressure PR of device D. As that pressure increases the rod 78 moves upwardly to actuate the nozzle pipe 26 in a direction to decrease the clearance between the tip of the nozzle 5 and the baffle portion 12. As shown, the nozzle pipe 26 is secured by a clip 88'$_a$ to a yoke or member 88 of substantially L-shape that is pivotally supported on a pin 89 carried by the head 72. The yoke 88 carries a screw 90 on which is a traveling nut 91 having a knife edge bearing on the cantilever spring 81 as shown. One end of screw 90 is journaled in the vertical leg of member 88 and the other end is journaled in a lug 88'$_b$ that depends from the horizontal leg thereof. The clip 88'$_a$ is secured to lug 88'$_b$. In the modifications shown in Figs. 5, 6, 7 and 9 the corresponding nozzle pipe is attached to the yoke of those viewed by lugs. These lugs are designated in those views as L5, L6, L7 and L9, respectively. The position of the nut 91 on screw 90 determines the rotational travel of the yoke 88 with reference to the travel of the rod 78.

As the cantilever spring 81 turns counterclockwise about its fixed support, the yoke 88 and the nozzle pipe 26 turn clockwise about the pivot 89. In order to facilitate rotation of the yoke 88 about that pivot, the nozzle pipe 26 is provided with a loop 92 at the location of the pivot 89.

Device D is provided with a valve 94 that is actuated by a diaphragm 95. The active pressure on the diaphragm 95 is governed by the relative clearance between the tip of nozzle 5 and the baffle portion 12. As shown, valve 94 is in a form of a ball and it controls an exhaust port 96 and an inlet port 97. The outlet pressure of the valve is supplied through a passageway 98 to the space between bellows 75 and 76 and to an outlet pipe 99 that carries the pressure output PR.

The pressure supplied to the nozzle pipe 26 is derived from the air supply to the inlet of the valve 94. That pressure flows through a passage 100, an orifice 101 and thence through a passageway 102 that leads to the upper side of the diaphragm 95 and to the nozzle pipe 26. Since the orifice 101 produces a pressure drop across it and since the pressure in the nozzle pipe 26 is also governed by the clearance between the tip of nozzle 5 and the baffle, the pressure in the nozzle pipe 26 and acting on diaphragm 95 will be governed by the space between the tip of the nozzle 5 and the baffle portion 12 and the pressure drop at orifice 101.

As the pressure in the nozzle pipe varies, the valve 94 is actuated either towards the inlet port or towards the exhaust port depending upon the magnitude of the pressure acting on the diaphragm 95. The supply pressure to the valve 94 and to the orifice 101 is provided by a source of supply not shown but which is indicated by a supply pipe 106. The pressure passes through a separator 107 and thence to a pipe 108 that leads to the inlet of valve 94. The outlet pressure PR which is delivered to pipe 99 is carried back to the body in which the separator 107 is located, and thence through a passage 110 to the outlet pipe PR.

A gauge 110' may be provided for measuring the supply pressure in pipe 106 and a gauge 111 may be utilized to measure the pressure PR.

The outlet pressure PR supplies reset to the device E and also feedback to the device D. As shown, the outlet pressure PR is passed through an adjustable orifice 112 into a pipe 113 that supplies the device E and the feedback chamber 71 of device D.

Figure 9:
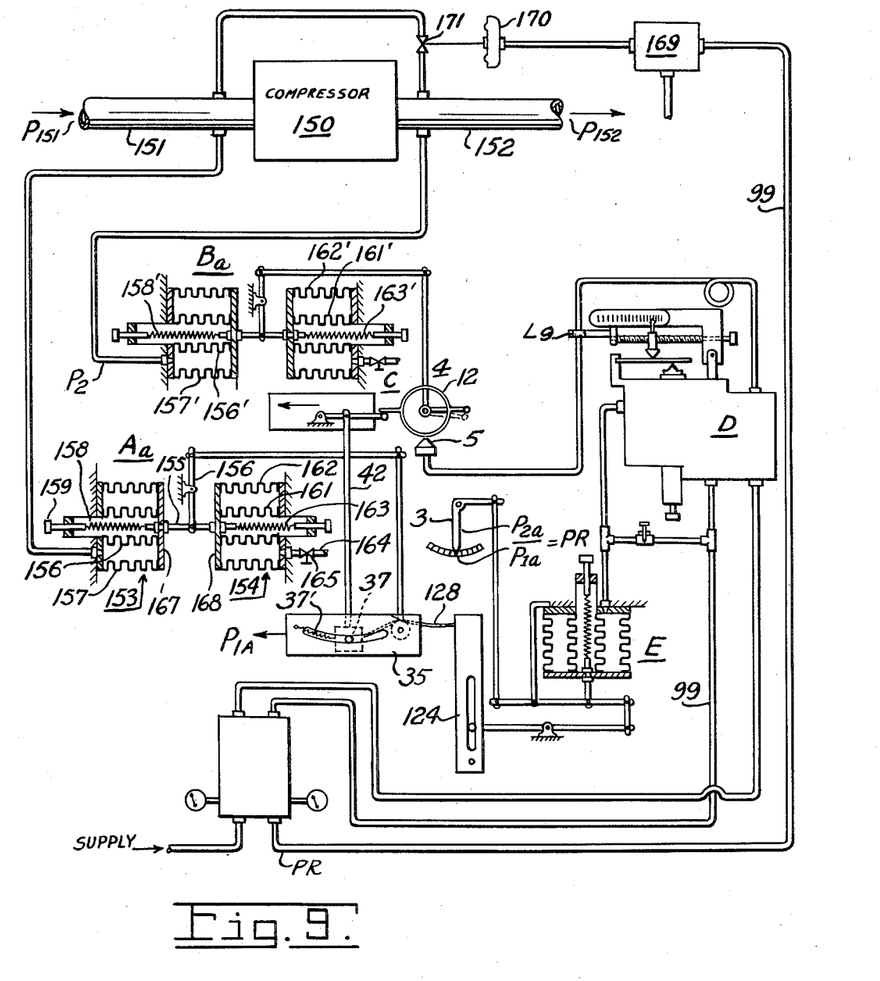
Fig. 9 is a diagrammatic view of a modification of the apparatus of Fig. 1 utilized to control the intake pressure of a compressor to prevent surging, the intake pressure being regulated in accordance with the ratio of the absolute intake to the absolute output pressures.

Device E is similar in construction to devices A and B; therefore, the corresponding parts will be designated by the same reference characters with double primes affixed. The pressure in pipe 113 may for convenience be designated pressure PRX because the value of that pressure will vary with the setting of orifice 112 and the rate of flow of air through the pipe PR. At a state of equilibrium the pressure PRX will equal pressure PR. The pressure PRX acts on the bellows of device E. There is only flow in pipe PR during a change in the pressure ratio $P_2/P_1$ because the pipe PR is dead-ended as shown in Fig. 9. With increasing pressures the lever 27" turns clockwise about the pivot 28". The left-hand end of lever 27" is pivotally connected to a link 115 which, in turn, is connected to a yoke 116 that is rotatably supported on shaft 7 and carries the pointer 3. Pointer 3 indicates the ratio of $P_2$ to $P_1$. The opposite end of lever 28" is connected by a link 117 to a radial crank arm 117' which is fast on a shaft 118 mounted in bearings 119 and 120. The shaft 118 has secured thereto a crank arm 121 having a pin 122 that operates in a slot 123 of a ratio lever 124 which is secured to a shaft 125 mounted in bearings 126 and 127. The free end of the ratio lever 124 is connected by a cable 128 to the yoke 37 of the compensating frame. Thus as the pressure PRX increases, the lever 124 is caused to turn counterclockwise on shaft 125 whereby the cable 128 is slackened causing the crosshead 37 to move to the left. The distance between the rollers 38 and 39 and the center of shaft 32 is thereby increased whereby the throw of lever arms 17 and 18 is increased for a given pressure in the pressure chamber 50 of device A, and the pressure in nozzle pipe 26 is reduced.

As the pressure PRX decreases the ratio lever 124 is rotated clockwise whereby the pull on the cable 128 is increased and the crosshead 37 moved to the right as seen in Fig. 1 whereby the baffle portion 12 is moved away from the nozzle 5 thereby decreasing the pressure in pipe 26.

Assuming that the pressure $P_1$ is increasing from say minimum value towards a maximum value, the baffle portion 12 will be moved towards the tip of nozzle 5 as previously described to effect an increase in pressure in nozzle pipe 26. That increase in pressure causes the diaphragm 95 to move downward as seen in Fig. 1 moving the valve 94 towards its inlet port and decreasing the pressure delivered to the space between bellows 75 and 76. This decrease in pressure causes these bellows to shorten, thereby turning the cantilever spring 81 clockwise and the yoke 88 counterclockwise about the pivot 89 whereby the tip of nozzle 5 is moved away from the baffle portion 12 until equilibrium is established. The pressure delivered to bellows 75 and 76 is also delivered through the orifice 112 to the space between the bellows of device E whereby the motion of these bellows is transmitted through the previously described linkages and ratio lever 124 to the link 42 whereby there is a positioning of the baffle 12 with respect to the nozzle 5 that causes the output pressure PR to bear a definite relationship to the pressure $P_1$.

If while the pressure $P_1$ is increasing the pressure $P_2$ is increasing also, the baffle 12 is moved towards the tip of nozzle 5 by pin 15 and away from the same by pin 11. Thus the pressure in nozzle pipe 26 may remain the same, or increase or decrease depending upon the relative motions produced by pressures $P_1$ and $P_2$. If the pressure in pipe 26 is increased the diaphragm 95 moves downwardly to restrict the inlet port of the valve thereby reducing the pressure acting on the bellows 75 and 76. As that pressure decreases the yoke 88 turns counterclockwise about the pivot 89 thereby moving the nozzle 5 away from the baffle 12 until the equilibrium is reestablished. The pressure PRX acts in the reset chamber 71 to oppose the pressure supplied to the space between bellows 75 and 76 and provides a reset action. The rate of the reset action is governed by the setting of needle valve 112.

The pneumatic transmitting device D in the apparatus of Fig. 1 acts as a controller to meet the requirements of the computing device; however, its output, as shown, is a proportional output representing the ratio of pressure $P_2$ to pressure $P_1$. As a controller, the nozzle 5 operates from a neutral position which means that for a condition of equilibrium the portion 12 of the baffle must always be in the same position relative to the nozzle for varying positions of the ends of the extensions 13 and 14 of the baffle. At equilibrium the pressures in chamber 71 and in the space between bellows 75 and 76 are equal.

The pressure $P_2$, as imposed on bellows 46' and 47', imparts a motion to shaft 7 which in effect establishes a set point by positioning the end of extension 13 of the baffle 4 at the point where it is supported on pin 11. Pressure $P_2$ as a quantity is indicated by pointer 2 on its associated scale. It should be mentioned that pointers 1 and 2 are always in the same position and indicate the pressure $P_2$. As an end result, the motion transmitted to yoke member 16 as carried to the opposite end of the baffle extension 14 by pin 15 must be equal and opposite to the motion imparted to extension 13 by pin 11 in order to satisfy the condition of equilibrium for the device D acting as a controller.

The above condition of equilibrium is maintained by multiplying the motion resulting from pressure $P_1$ by the motion of bellows 46" and 47" of device E through the multiplying coupling consisting of the compensating frame 35, the ratio lever 124 and the radial coupling lever 117'. The output of device D changes to whatever value is necessary to establish a condition of equilibrium; consequently by feeding back the pneumatic output PR with reset to the bellows 46" and 47" the equation of $(P_1 \times PR) = P_2$, or PR, the output pressure, equals $P_2$ divided by $P_1$. This ratio or output pneumatic pressure is indicated mechanically by the pointer 3 of yoke 116, the motion of the yoke being proportional to the motion of the bellows 46" and 47" of device E.

Figure 5:
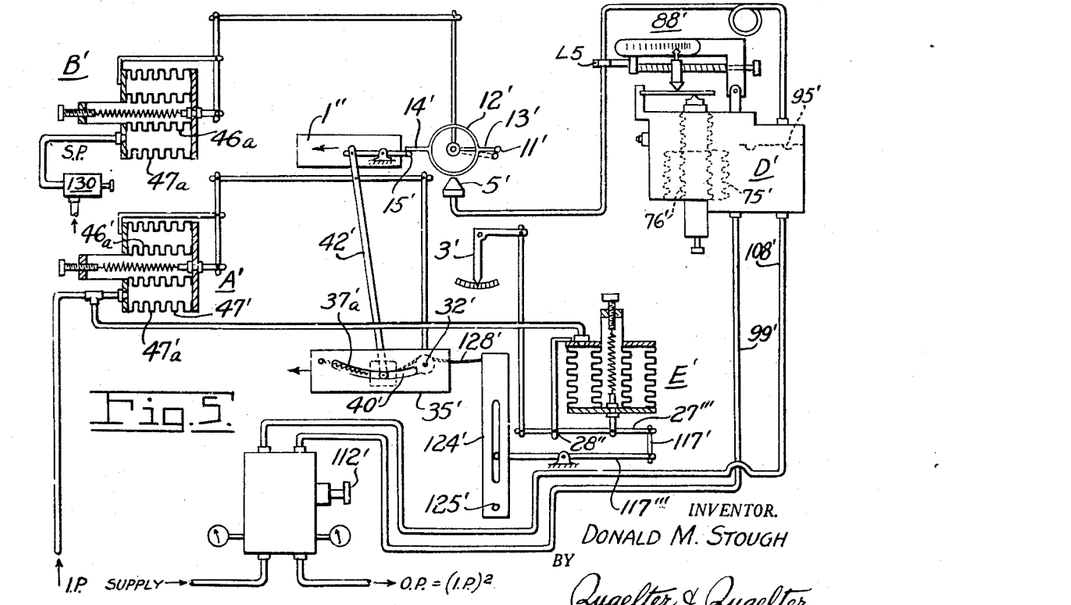
Fig. 5 is a more or less diagrammatic view of the apparatus shown in Fig. 1 arranged to provide an output that is proportional to the square of an input.

*The apparatus of Figure 5 in which the output is proportional to the square of an input pressure*

The various components of the apparatus of Fig. 5 that are identical with the components of Fig. 1 will be designated by the same reference characters with primes or other distinguishing characters affixed. It should be noted that as there is no feed back in Fig. 5, the rotation of pin 15' is the opposite of that of pin 15 as produced by pressure $P_1$ in Fig. 1.

The system of Fig. 5 is so utilized that the output pressure O. P. is equal to the square of the input pressure. In Figure 5 the input devices are indicated at A' and B'. Similarly, devices corresponding to devices D and E of Fig. 1 are designated D' and E' in Fig. 5.

In the Fig. 5 system the input pressure I. P. is supplied to the space between bellows $46'_a$ and $47'_a$ while a set point pressure which may be adjusted is supplied to the space between bellows $46_a$ and $47_a$ by means of a valve 130 which is so constructed that the pressure delivered may be varied from zero gauge pressure to any predetermined desired positive value. The set point pressure merely changes the range relationship of the input pressure I. P. to the output pressure which is proportional to the square of pressure I. P.

Assuming that a pressure I. P. of variable character is being delivered to unit A' then the compensating frame 35' will be rotated counterclockwise about its shaft 32' as the pressure I. P. increases and clockwise as I. P. decreases. Rotation of the shaft 32' in a counterclockwise direction causes the link 42' to move downwardly whereby baffle extension or wing 14' is rotated clockwise with reference to its support pin 11' thereby increasing the clearance or space between the baffle portion 12' and the nozzle 5'. As that clearance increases, the pressure on the diaphragm 95', corresponding to diaphragm 95 of Fig. 1 decreases whereby diaphragm 95' flexes upwardly, thereby reducing the rate of escape of pressure from pipe 108'. As a consequence, the pressure delivered to the space between the bellows 75' and 76', that is, the bellows corresponding to the bellows 75 and 76 of Fig. 1, is increased. The increase in that pressure causes the nozzle beam 88' to rotate clockwise, thereby bringing the nozzle 5' back towards the baffle 12' and increasing the pressure acting on the control diaphragm 95' or the control diaphragm corresponding to the diaphragm 95 of Fig. 1. That increase in pressure delivered to the interior of or the space between bellows 75' and 76', causes an increase in pressure in pipe 99'. When pressure conditions are at an equilibrium in the device D', the space between nozzle 5' and baffle 12' will be that corresponding to neutral position. The input pressure I. P. is also delivered to device E'. It will be remembered that in Fig. 1, the output pressure of device D is fed back to device E through the needle valve 112. In that respect Fig. 5 also differs from Fig. 1; it also differs in that there is no feed back of output pressure to chamber 71 of device D'. Since there is no feed back to device D', the nozzle 5' is positioned in accordance with the output pressure in pipe 99'. The pressure I. P. acting on device E' of Fig. 5 causes the slotted lever 124' to be rocked clockwise about its supporting shaft 125'. As the lever 124' rotates clockwise, the lower end of the link 42' is moved along the arcuate slot 40' of the compensating lever 35' toward the shaft 32', pushing the link 42' upwardly and thereby lowering the baffle extension 14' to assist in returning the position of the baffle with respect to the nozzle, to the neutral or equilibrium position. When that position of equilibrium is achieved, the output pressure O. P. will be equal to the square of the input pressure I. P.

The pointer 1" being actuated by the link 42' through the compensating lever 35' indicates the value of (I. P.)². A pointer 3' which is actuated by device E' indicates the value of pressure I. P. As in the case of Fig. 1, there is no flow in the output line O. P. except when there is a pressure change in the output of device D' and in line 99'. That change occurs when the valve 94' is actuated.

Figure 6:
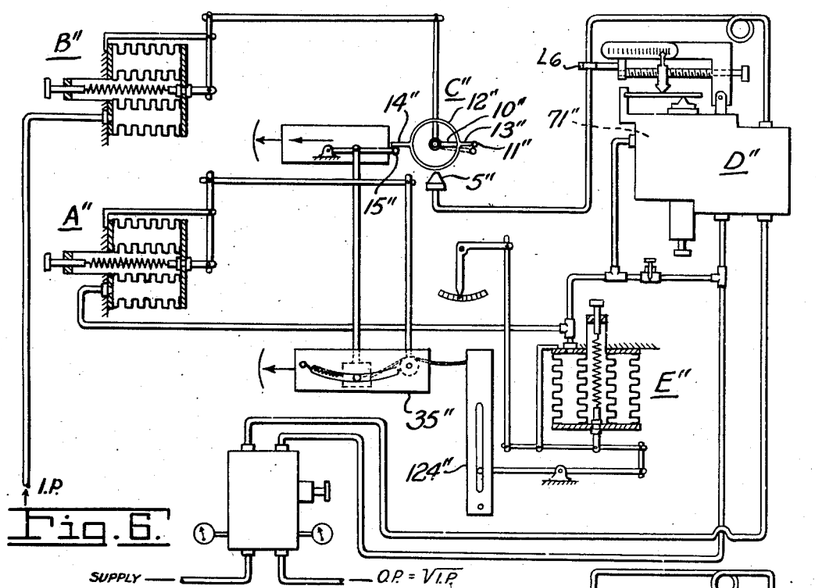
Figs. 6 and 7 are modifications of the apparatus of Fig. 1 in which respectively, the output is proportional to the square root of the input and the output is proportional to the product of a plurality of inputs.

The system of Figure 6

The system of Fig. 6 is the system of Fig. 1 modified to provide an output that is equal to the square root of the input that is $OP = \sqrt{IP}$.

Device B" receives the input pressure I. P. Devices A" and E" receive the same pressure as the feed back chamber 71" of device D" receives. Device D" acts in the same manner as device D of Fig. 1. Devices E" and A" so adjust the baffle portion 14" that the nozzle 5" will come to a neutral position with respect to the baffle 12" when conditions are in equilibrium in device D". Since the feed back pressure to chamber 71" of device D" acts on means C" and A", the final output pressure O. P. will be proportional to the square root of the input pressure I. P.

Changes in pressure in device B" effect rotation of the baffle portion 13" about the point where the baffle portion 14" is supported by the pin 15". The positioning of pin 15" by the joint action of devices A" and E" through the slotted compensating beam 35" and the slotted lever 124" results in such a positioning of baffle 12" with respect to the nozzle 5" that the output pressure of device D" is proportional to the square root of the input pressure I. P.

Figure 7:
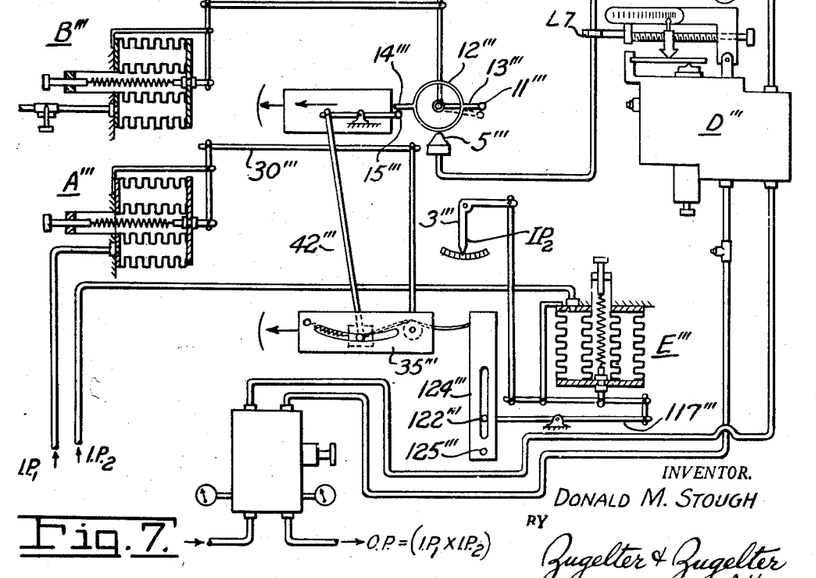

The system of Figure 7

The system of Figure 7 is a rearrangement of Fig. 1 which produces an output pressure that is proportional to the product of input pressures I. P.$_1$ and I. P.$_2$ i. e., $OP = (IP_1 \times IP_2)$. As in Fig. 5, the feed back of output pressure to chamber 71''' of device D''' is omitted, therefore, the motion of pin 15''' is the reverse of that of pin 15 in Fig. 1 as produced by changes in pressure P$_1$. Device B''' may be subjected to zero gauge pressure or to any predetermined set point pressure, the effect of which is to hold the baffle extension 13''' in a fixed position while the baffle portion 14''' is free to be rotated about the pin 11''' in the normal functioning of the system. The device A''' receives the input pressure I. P.$_1$ and the device E''' receives an input pressure I. P.$_2$. Therefore, devcie E''' actuates the slotted lever 124''' in accordance with the magnitude of the pressure I. P.$_2$ thereby positioning the crosshead of link 42''' in accordance with the magnitude of that pressure and changing the length of the radius arm at which the pin 122''' acts with respect to the bearing pin 125''' for the lever 124'''. The compensating lever 35''' is positioned in accordance with the magnitude of pressure I. P.$_1$. Therefore, the throw or travel of the link 42''' will be a function of the product of the two input pressures I. P.$_1$ and I. P.$_2$. Thus, the output pressure of device D''' is equal to $(IP_1 \times IP_2)$.

Figure 8:
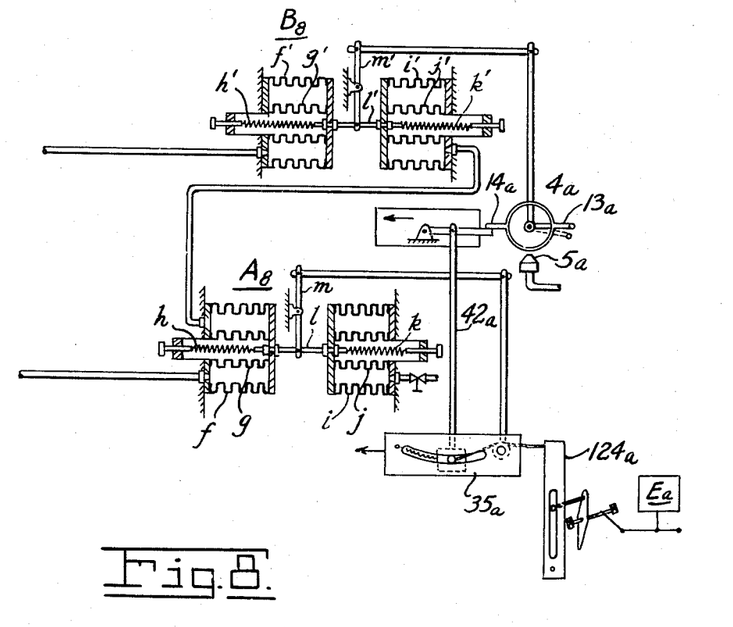
Fig. 8 is a view in which the systems of Figs. 1 and 9 are modified in certain respects and so arranged and utilized that the output pressure is proportional to the ratio of $$\frac{P_2-P_1}{P_1}$$

The system of Figure 8

The system of Fig. 8 is like that of Figs. 1 and 9 in all respects, with the exception that units A$_8$ and B$_8$ have been substituted for units A and B of Fig. 1 and the corresponding pressure receiving units of Fig. 9.

Unit A$_8$ comprises concentric bellows $f$ and $g$ that work against a tension spring $h$ as shown, and pressure P$_1$ is supplied to the annular space between these bellows. The unit also includes concentric bellows $i$ and $j$ that work against a tension spring $k$, as shown. The annular space between these bellows may be evacuated in case pressures P$_1$ and P$_2$ are below atmospheric and an absolute pressure ratio is to be computed. If the pressures P$_1$ and P$_2$ are above atmospheric, bellows $i$ and J may be at atmospheric pressure.

The free ends of bellows $i$ and $j$ and $f$ and $g$ are connected by a rod $l$ and lever $m$ to the compensating member 35$_a$ that operates the link 42$_a$ for the baffle 4$_a$ associated with nozzle 5$_a$.

Unit B$_8$ may be of the same construction as unit A$_8$; therefore, similar parts have been designated by the same characters with primes affixed. Unit B$_8$ operates the extension 13$_a$ of the baffle, while unit A$_8$ operates the extension 14$_a$ thereof.

Pressure P$_1$ is supplied to the annular space between bellows $f$ and $g$ and I' and $j'$. Pressure P$_2$ is supplied to the annular space between the bellows $f'$ and $g'$; therefore, the motion imparted by lever $m'$ to baffle 4$_a$ is proportional to P$_2$–P$_1$.

Springs K and K' may be omitted when springs $h$ and $h'$ provide adequate tension.

The motion imparted to baffle 4$_a$ by the action of lever $m$ and member 35$_a$ and by the slotted radial coupling arm 124$_a$, as effected by the feed back pressure to unit E$_a$, effects the relationship $$\frac{P_2 - P_1}{P_1}$$

The purpose of the Fig. 8 arrangement is to suppress the range of the system to a ratio of $$\frac{P_2-P_1}{P_1}=Q$$

the ratio quantity, to unity. Therefore, $$\frac{P_2}{P_1}-1=Q$$

If $P_2/P_1$ is the ratio R, then $R=Q+1$. When Q is zero, the system shows a ratio of 1 (unity). Therefore, it follows that the system will always indicate a ratio which is always positive and greater than 1, but never less than 1 (unity).

The system of Figure 9

The system of Fig. 9 is a modified form of the system shown in Fig. 1, utilized to regulate the ratio between the intake and outlet or discharge pressures of a compressor.

The compressor is schematically illustrated at 150. The intake of the compressor is represented by a pipe 151 and the output is represented by a pipe 152. In the operation of compressors and particularly where there are several stages of compression, a disturbance known as surging results when a certain ratio between the intake pressure and the output pressure is exceeded. Therefore, the system of Fig. 9 is arranged to maintain a desired or predetermined non-surging ratio between the intake and output pressures of the compressor by controlled bleeding back of compressed medium from pipe 152 into the intake pipe 151. By so controlling the amount of bleed back the ratio between the intake pressure and the output pressure may be maintained within a non-surging ratio. In practice the ratio maintained in a particular case is related to the speed at which the compressor is driven.

The control system for effecting a non-surging ratio is identical with that shown in Fig. 1 except that absolute pressure responsive units $A_a$ and $B_a$ have been substituted for the pressure receiving units A and B. Device $B_a$ responds to the absolute pressure at the outlet of the compressor 150 and unit $A_a$ responds to the absolute pressure at the intake to the compressor. Since the system of Fig. 9 is the same as that of Fig. 1, except for the substitution of the absolute pressure input units, only the units $A_a$ and $B_a$ need be described.

Device $A_a$ comprises a pair of separate bellows units 153 and 154, the movable ends of which are connected by a link 155 to a lever 156 corresponding to lever 27 of Fig. 1. The bellows unit 153 comprises inner and outer bellows or pressure deflectable members 156 and 157 that work against a spring 158 the tension of which can be adjusted by means of an adjusting screw 159. The bellows unit 154 comprises inner and outer bellows 161 and 162 that operate against the tension of a spring 163. The space between the bellows 161 and 162 is evacuated through a pipe 164 in which there is a shutoff valve 165 which is used to hold the vacuum on the bellows.

Springs 163 and 163' may be omitted when springs 158 and 158' provide sufficient tension.

Since atmospheric pressure acts on the free ends 167 and 168 of the units 153 and 154, it follows that the effect of atmospheric pressure is canceled out. Therefore, the force exerted on the lever 156 will be proportional to the absolute pressure supplied to the space between bellows 156 and 157 from the compressor intake pipe 151. Therefore, the angular motion of the compensating lever 35 will be proportional to the value of the absolute pressure in the intake pipe 151.

The unit $B_a$ is identical in construction to the unit $A_a$, therefore, corresponding and similar parts will be designated by the same reference characters with primes affixed. The motion of the compensating beam 35 and of the slotted lever 124 which results from the output pressure delivered to device E, causes the baffle 12 to be so positioned that the resultant output pressure established in line 99 will be proportional to the pressure in line 152, the outlet of the compressor, divided by the pressure at the intake of the compressor, or, in other words the output pressure in line 99 will be proportional to $P152/P151$.

The output pressure in line 99 is transmitted to a regulator 169. That regulator is of the type that generates a control pressure that is transmitted to the diaphragm operator 170 of a valve 171. The regulator 169 while responding to the input pressure from line 99 is constructed to generate a definite control force but which can be modified and related to the speed at which the compressor is driven. In other words, for different speeds there will be different control forces developed for a given pressure in line 99.

Valve 171 controls the bleed back of compressed medium from pipe 152 to the intake 151 in accordance with the requirements for maintaining the ratio of $P152/P152$ within the non-surging ratio at any speed of operation of the compressor.

Having thus described the invention it will be apparent to those of ordinary skill in the art to which the invention pertains that various modifications and changes may be made in the illustrated embodiments without departing from either the spirit or the scope of the invention.

Therefore, what is claimed as new and desired to be secured by Letters Patent is:

1. A system for computing an output pressure signal based on one or more input pressures, that comprises a regulator having a source of supply of pneumatic pressure, a valve having a supply pressure inlet port, an output pressure outlet port and an exhaust port, a diaphragm for operating the valve to vary the outlet pressure, a duct having an orifice, means for supplying a pressure from the supply port of the valve through the duct and orifice onto said diaphragm, a pivoted nozzle pipe connected to receive a pressure from the supply pressure on the diaphragm, said pipe having a nozzle through which air escapes, pressure deflectable means connected to the valve outlet port for actuating said nozzle pipe about its pivot, a baffle disposed adjacent said nozzle for controlling the discharge of air therefrom and varying the pressure on said diaphragm and thereby controlling the magnitude of the pressure at the outlet port, a first input pressure deflectable means for moving said baffle towards or away from the nozzle, a second pressure input responsive deflectable means, linkage means actuated by said second input deflectable means for actuating said baffle, and a third pressure deflectable means responsive to the output pressure at the outlet port of said regulator for so modifying the motion of said linkage means that the output pressure of said regulator is caused to bear a predetermined relationship to said input pressures.

2. A system as in claim 1 in which the first and second input pressure deflectable means receive input pressures $P_2$ and $P_1$, respectively, and that the means for actuating the baffle by said second input deflectable means and the regulator output pressure responsive means, comprises a compensating member mounted to rotate about a pivot, the second deflectable member having linkage for rotating that compensation member, the compensating member having a track extending lengthwise thereof and a crosshead mounted in the track, the crosshead having linkage connected to said baffle, and yielding means for urging the crosshead in one direction along the track, the regulator output pressure responsive means having a crank and pin, a pivoted lever provided with a slot extending radially of the pivot for receiving said crank pin, and a member connecting the slotted lever to said crosshead for actuating the same against the force of the urging means, the slotted lever and compensating member giving to the baffle a motion relative to the motion imparted thereto by the first input pressure deflectable means that produces an output pressure ratio PR that is proportional to $P_2/P_1$.

3. A system as in claim 1 in which the first deflectable input means is adapted for adjustment to a predetermined but fixed deflection, the second and third pressure deflectable responsive means are disposed to receive a variable input pressure whereby the baffle is so positioned that the output pressure of the regulator is proportional to the square of the input pressure.

4. A system as in claim 1 in which the first pressure input means is responsive to a variable input pressure and that the second pressure deflectable means is connected to be responsive to the output pressure of said regulator whereby the baffle is so operated relative to the nozzle that the output pressure is proportional to the square root of the input pressure.

5. A system as in claim 1 in which the first pressure deflectable means is adapted to be responsive to an input pressure I. P.$_1$ and the second and third pressure deflectable means are adapted to be responsive to a second input pressure I. P.$_2$ whereby the baffle is so positioned relative to the nozzle that the regulator output pressure is proportional to the product of I. P.$_1$ and I. P.$_2$.

6. A system as in claim 1 in which the first and second input pressure deflectable members each include a pressure input receiving deflectable member, an evacuated deflectable means and a member coupling said deflectable members to each other so that the motion thereof is proportional to the absolute value of the input pressure.

7. A system as in claim 1 in which the first pressure deflectable member responds to an input pressure $P_1$ and the second pressure deflectable member responds to the difference between an input pressure $P_2$ and the pressure $P_1$, whereby the output pressure of the regulator will be proportional to Q where $$Q = \frac{P_2 - P_1}{P_1}$$

or $$\left(\frac{P_2}{P_1} - 1\right)$$

References Cited in the file of this patent

UNITED STATES PATENTS

| | | |
|---|---|---|
| 2,000,721 | Standerwick | May 7, 1935 |
| 2,310,415 | Frymoyer | Feb. 9, 1943 |
| 2,314,152 | Mallory | Mar. 16, 1943 |
| 2,632,456 | Breedlove | Mar. 24, 1953 |
| 2,638,874 | Woodhull | May 19, 1953 |
| 2,661,145 | Heineman | Dec. 1, 1953 |
| 2,771,897 | Bailey | Nov. 27, 1956 |